Dec. 20, 1960    D. B. KUSIV    2,965,700
ELECTRICAL WIRE SPLICING DEVICE
Filed Dec. 13, 1954    2 Sheets-Sheet 1
FIG. 1
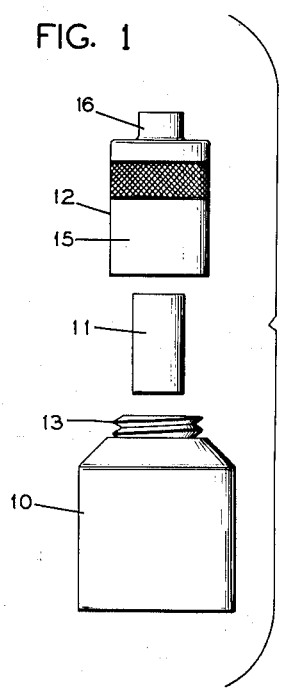
FIG. 2
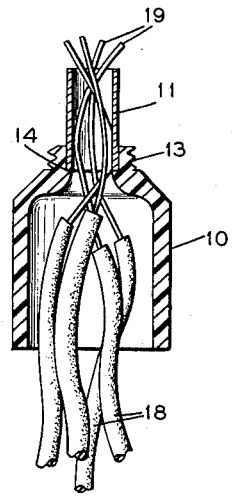
FIG. 3
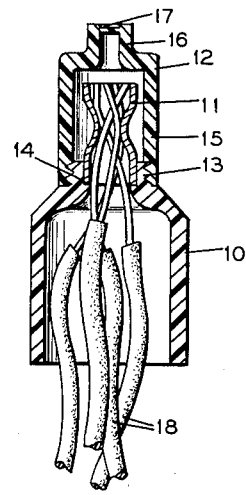
FIG. 6
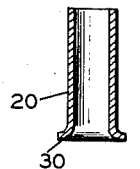
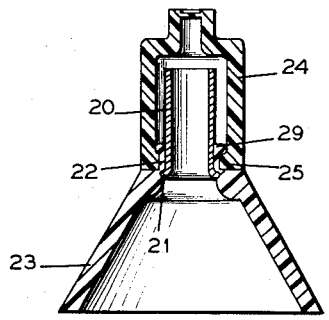
FIG. 4
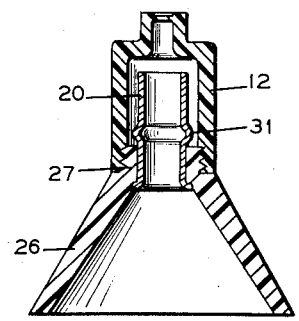
FIG. 5
FIG. 7
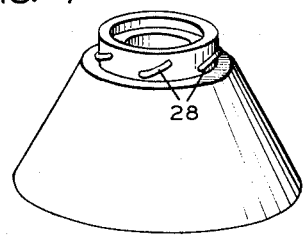
INVENTOR.
DANIEL B. KUSIV
BY Wenderth, Lind & Ponack
ATTORNEYS Dec. 20, 1960 D. B. KUSIV 2,965,700
ELECTRICAL WIRE SPLICING DEVICE
Filed Dec. 13, 1954 2 Sheets-Sheet 2
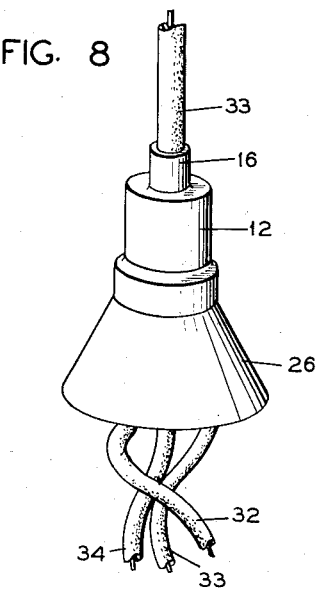
FIG. 8
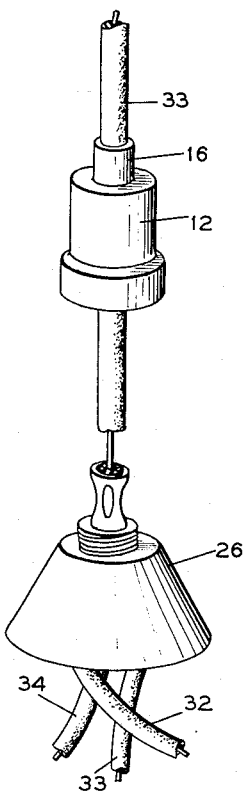
FIG. 9
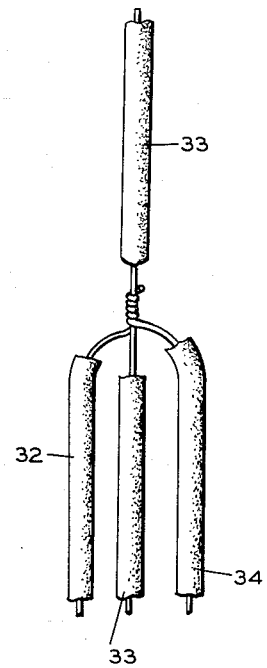
FIG. 10
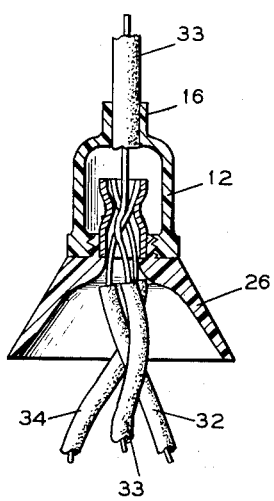
FIG. 11
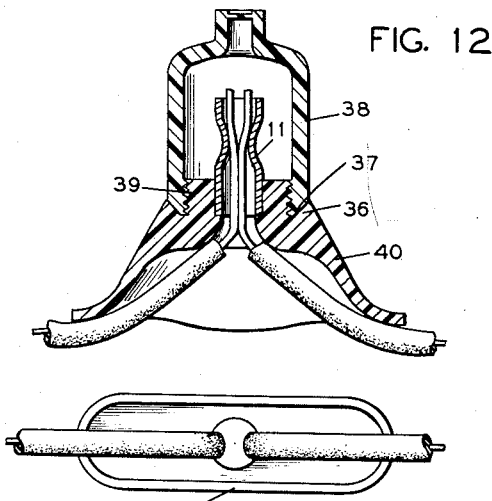
FIG. 12
FIG. 13
INVENTOR.
DANIEL B. KUSIV
BY Wenderoth, Lind & Ponack
ATTORNEYS United States Patent Office 2,965,700
Patented Dec. 20, 1960

2,965,700

ELECTRICAL WIRE SPLICING DEVICE

Daniel B. Kusiv, Cranford, N.J., assignor, by mesne assignments, to Buchanan Electrical Products Corporation, Hillside, N.J., a corporation of New Jersey Filed Dec. 13, 1954, Ser. No. 474,860

10 Claims. (Cl. 174—87)

The present invention relates to an electrical wire splicing device.

This application is a continuation-in-part of my abandoned application Serial No. 385,567, filed October 12, 1953.

Heretofore, in splicing devices of this type, it has been customary to provide a metal splicing sleeve into which the ends of the wires to be spliced are inserted. This sleeve is then crimped or swaged to secure the wires therein. The sleeve is usually provided with means cooperable with an insulating cap adapted to be positioned over the splicing sleeve. Thus, the splicing sleeve may be provided with lugs to engage threads on the interior of the cap, or may be provided with projections over which the cap is snap-fitted, the cap in the latter case being resilient.

The disadvantages of these devices are many. Firstly, a certain amount of force is generally necessary to place the caps onto the splicing sleeves, an operation performed by hand by the electrician who makes the splice. This force can be no greater than the force with which the wires can resist. This force is thus limited, especially with wires having a relatively soft core such as copper, where the force is exerted longitudinally of the wires. The force with which the caps are placed on the sleeves being limited, the force which will pull the cap over the sleeve is likewise limited. The result is that caps of this type are easily pulled off the splicing sleeve.

In splicing devices in which the sleeve is threaded into the cap, the twisting force with which the cap can be screwed over the sleeve is limited in the same manner as in caps which are forced directly onto the sleeves. While the resistance to pull-off is greater, the cap cannot be threaded tightly onto the sleeve, and consequently the engagement between the two is not positive, and the cap is insecurely attached to the sleeve.

Secondly, these splicing devices have difficulty passing the Underwriters' Laboratory test in which the spliced wires are pulled in opposite directions at right angles to the axis of the sleeve and the cap. The caps are generally of rubber or plastic, and extend a short distance over the insulation of the wires adjacent the splice. When the wires are pulled, they bear against the edge of the cap, and in the case of the rubber caps stretch them, thus forcing them to separate from the sleeve. Even if the cap is fitted onto the sleeve securely enough to resist being separated, nevertheless the lower edge of the cap will flex upwardly, thus permitting the edge of the sleeve to bear directly on the conductors where they enter the splicing sleeve. In the case of rigid plastic or porcelain caps, these tend to cut the insulation on the wires, and when the pull is increased substantially, the caps may even split, thus destroying the effectiveness of the connection.

Thirdly, any force which tends to separate the wires and the cap is transmitted directly to the cap through the splicing sleeve. Since the cap is connected directly to the sleeve by a connection which is only hand tight, there is a definite risk of disturbing the cap covering the splice and pulling it off easily.

Fourthly, in the case of connectors having the splicing means included in the cap, when the caps are removed, it is at the risk of disturbing the splices. This disadvantage is particularly objectionable to those charged with inspecting wiring, because they must inspect the splices beneath the caps, but can do so only at the risk of injuring what is probably a satisfactory splice.

Further, heretofore none of the splicing devices have been adapted for use on splices in which a wire projects from the splices through the cap.

It is an object of the invention to provide a splicing device with a minimum of parts which overcomes all of the above disadvantages. It is a further object of the invention to provide a structure of the character described whereby the splicing is realized by crimping of a metallic splicing sleeve by means of a crimping tool such as is conventional in the art. A further object is to make it possible to cap the device regardless of distortion of the crimping sleeve which may have resulted from the crimping.

A still further object of the invention is an arrangement of parts in a splicing device wherein the portion of the wires just below the splices are positively "bushed," preferably by non-metallic material, whereby wear and tear at such point is reduced to a minimum.

The foregoing and other objects, which will be evident from the detailed disclosure which follows, are realized by the relationship of parts according to the present invention, as shown in presently preferred representative embodiments on the accompanying drawings and described in the following description with reference to such drawings.

In the drawings,

Fig. 1 is an exploded view, in elevation, of the invention as used with one form of splice;

Fig. 2 is a sectional view through a portion of the assembled structure with spliced electric wires in place therein;

Fig. 3 is a sectional view through the insulator body and splicing sleeve, with the spliced wires crimped in place and the caps on;

Fig. 4 is a sectional view showing the relationship of parts according to a modified form of wire splicing device;

Fig. 5 is a sectional view showing the relationship of parts according to still another modified form of wire splicing device;

Fig. 6 is a sectional view of the splicing sleeve of Figs. 4 and 5 prior to insertion into the insulator body;

Fig. 7 is a view in perspective showing an alternative form of cap-engaging means;

Fig. 8 is an assembled view showing the invention used with an alternative form of splice which is adapted to situations where the wire continues through the device;

Fig. 9 is a partly disassembled view of the device according to Fig. 8;

Fig. 10 shows the circuit wires to be spliced by the said alternative splice;

Fig. 11 is a view partly in elevation and partly in vertical longitudinal section through Fig. 8;

Fig. 12 is a view, partly in section, through a further modification of the invention; and Fig. 13 is a bottom view of the relationship of parts according to Fig. 12.

Referring first to the splicing device as shown in Figs. 1 to 3, the wire splicing device according to the invention comprises three parts, as clearly apparent from Fig. 1. These three parts are, first, an insulator body or skirt 10; secondly, a splicing sleeve 11; and thirdly, an insulating cap 12.

Insulator skirt 10 is preferably made of nylon, vinyl resin or other plastic material with insulating properties. As shown, more particularly in Figs. 2 and 3, it comprises a substantially cylindrical hollow body member open at one end, the other end being provided with an outwardly converging wall which is centrally bored in a manner hereinafter more especially described, and which terminates in an externally threaded cylindrical flange or boss 13. The bore of the said wall is such that a continuous annular shoulder is provided intermediately thereof, as clearly shown at 14 in Figs. 2 and 3.

The splicing sleeve 11 may advantageously be of simple cylindrical configuration and may be composed of copper, bronze, steel or other suitable metallic material. The outer diameter of sleeve 11 is such that it may be press-fitted into the bore in the end wall of the body 10, to bear solidly against the aforesaid continuous annular shoulder 14 as shown in Figs. 2 and 3.

The lower portion 15 of cap 12 is also essentially cylindrical in configuration, being open at one end and partially closed at the other. The upper portion 16 of cap 12 is generally cylindrical and extends upwardly from the partially closed end of the lower portion of the cap. The upper portion is centrally bored and its uppermost end is closed by knockout disc 17, formed integrally therewith, but of reduced thickness to be easily removable. As may be seen in Fig. 3, the lower internal surface of the cap 12 may be threaded so that it may be screwed onto the external threads provided on flange 13. Cap 12 is advantageously also made of synthetic material such as that used to make the insulating body 10, e.g. nylon or the like.

It should be noted that the manufacturer press-fits the sleeves 11 into the skirts 10, and the device reaches the user in this form.

In using the splicing device with a splice of the type shown in Figs. 2 and 3, the wires 18 to be spliced together are inserted, after the insulation has been stripped from the ends thereof, as shown in Fig. 2, from the open end of the insulator body until the insulation-free wire ends 19 are in position in splicing sleeve 11 with the ends of the wire projecting outwardly therefrom. Thereupon, the sleeve 11 is crimped in the conventional manner with any suitable conventional crimping tool. Excess wire projecting beyond the end of sleeve 11 is then cut off even with the outer end of the sleeve as seen in Fig. 3. Cap 12 is then screwed in place.

The result is a splice which, because of the support provided by the continuous annular shoulder 14 to hold the sleeve 11, resists pull-out. The force necessary to pull the sleeve and splice out of the skirt would have to be great enough to shear shoulder 14 from the skirt. Moreover, the portions of the wire just inwardly of the sleeve are "bushed" by the adjacent portions of the insulating body 10, as is best shown in Figs. 2 and 3. In view of the material of which the said body is made, it will be evident that there is a minimum tendency for a wearing or severing action to be exerted on the wire at this point. The open end of the sleeve 11 permits passage of all the wires completely through the sleeve and thus beyond the point of crimp. The fact that the wires may be inserted through the splicing sleeve 11 also disposes of any necessity of stripping insulation from the wire ends for only a certain distance, a distinct advantage in the use of the device.

Since the sleeve 11 is rigid with skirt 10 by reason of the press fit, and the spliced wires 18 are crimped into the sleeve, the attachment of the cap over the sleeve can be made independently of the rigidity of the wires. The skirt 10 may be grasped in one hand and the cap in the other, and the cap screwed onto the skirt. No longitudinal or twisting force is exerted on the wires or on the splice and crimped sleeve. All the force is exerted between the skirt and the cap.

A force tending to pull the wires out of the device must be great enough to shear shoulder 14 or threads 13 on the skirt, or to tear the wires from the crimped sleeve. Further, because the cap is threaded to the skirt, removing it to inspect the splice will in no way disturb the splice, which has been crimped into the sleeve. In addition, since removal of the cap will entail grasping the skirt in one hand and the cap in the other, and both parts are insulators, the cap can be removed for inspection even while current is flowing without danger.

With the cap as shown in Figs. 1 to 3, sufficient space is provided within the cap to permit it to be positioned over the crimped sleeve regardless of how badly the sleeve has been distorted by the crimp.

The relationship of parts shown in Fig. 4 is fundamentally the same as the device shown in Figs. 1 to 3, although there are a number of modifications therein. Thus, the sleeve 20 is peened outwardly slightly at its lower end, as seen at 30 in Fig. 6. The result is that when it is press-fitted into the bore in annular flange or boss 22 onto continuous annular shoulder 21, the latter—being made of nylon or the like synthetic material which has a natural "give"—snaps into place over the adjacent slightly outwardly peened end. This substantially enhances the integral character of the skirt 23 and sleeve 20 when assembled. The skirt 23 itself is, in this embodiment, frusto-conical instead of cylindrical in configuration, although the flange 22 in which the continuous annular seating shoulder 21 is provided is, like flange 13, essentially cylindrical. Instead of being externally threaded, the flange 22 is provided with an annular ridge 29. The internal threads of the cap 24 are replaced in this embodiment by an inwardly extending ridge 25. Due to the yielding character of the material of which the parts 29 and 24 are made, e.g. nylon, the cap may simply be snapped onto the body and into the position shown in Fig. 4 of the drawings. Sleeve 20 is made of the same material as sleeve 11. The use of the device is essentially as described in connection with Figs. 1 to 3.

Fig. 5 illustrates a further modification of construction within the scope of the present invention. As shown, this embodiment comprises an insulating skirt 26 similar to that of Fig. 4, except that the flange or boss 27 is externally threaded as in the embodiment shown in Figs. 2 and 3. Correspondingly cap 12 of this further modification is internally threaded and is otherwise substantially the same as the cap 12 in the embodiment of Figs. 2 and 3. If desired, however, the arrangement for mounting the cap on the skirt may correspond to that of Fig. 4; in fact, other suitable integrating means may be used in this connection as, for example, one or more helicoidal or circumferential ridges 28, as shown in Fig. 7 of the drawings. The cap itself is not limited to a cylindrical shape.

The primary difference in the embodiment of Fig. 5 is to be found in the method of retaining the splicing sleeve in the skirt. The splicing sleeve is a metallic cylinder—the material of which corresponds to that of the previously described splicing sleeves of the invention—and is, as in the embodiment of Fig. 4, provided at its lower end with an outwardly extending flange 30 which is arcuate in cross section, whereby a curved surface is presented to adjacent wire portions passing through the sleeve. The sleeve, in this case, is inserted into the insulating skirt from the flared end, and the top inner surface of the skirt is recessed, as illustrated, to receive the flange 30. The fit of the sleeve in the bore of flange 27 and the recess at the top of the skirt is a press fit. In order to further retain the sleeve 20 in place, it is then subjected to a swaging or upsetting operation in order to form the outwardly extending annular hollow rib 31, bearing on the top of the flange 27. It will again be appreciated that the joining of the sleeve and the skirt is accomplished by the manufacturer.

As in the other embodiments, the open-ended character of the splicing sleeve ensures passage of the wire conductors past the point of crimp. The crimping, to effect splicing, is carried out as precedingly described.

Figs. 8 to 11 inclusive of the drawings illustrate the use of the splicing device with a different type of splice. As shown, the arrangement is particularly adapted for splicing together a plurality of circuit wires 32, 33 and 34, the spliced conductor 33 continuing through the upper portion 16 of cap 12, the knockout disc 17 having been removed. This arrangement enables attachment of the wire 33 to a fixture or an appliance through the cap. Not only can the device be easily installed with the wire through the cap, but the cap can be removed for inspection of the splice in the same manner as when there is no wire extending through the cap. In addition, the necessity for a fourth wire from the splice back through the skirt to the fixture, normally required in existing connectors, is eliminated.

The embodiment shown in Figs. 12 and 13 is essentially the same as that according to Fig. 2 or Fig. 4. A primary difference is that the seat 36, upon which the inner edge 37 of the cap 38 seats, when in mounted position, tapers upwardly and outwardly as shown, the juxtaposed edge 37 of the cap being correspondingly flared. An advantage of this detail is that the tapered seat 36 causes the cap 38 to tighten radially on the body, so to speak, and thus to cause the lower end of splicing sleeve 11 to be tightly and snugly encompassed by the surrounding flange or boss 39.

Figs. 12 and 13 illustrate the ability of the splicing device according to the invention to meet with the UL test. The UL test, as previously described, involves the application of pulling forces in opposite directions laterally, the device being not otherwise suspended. The present device fulfills the requirements of this test with ease. The skirt 40 may be deformed as shown in Figs. 12 and 13 without danger to the splice or danger of the cap coming off. Since all of strain of the pull comes on the joint between the splicing sleeve and the skirt, the threads and cap are left undisturbed to protect the splice. The tough, semi-rigid skirt of the body, preferably made of nylon, serves as a bushing or strain reliever and protects the conductor strands and insulator from possible damage at the lower end of the splicing sleeve.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

I claim:

1. An electrical wire splicing device comprising a nylon insulating skirt flared at one end and terminating at its other end in a centrally bored flange, the bore having two diameters forming a continuous annular shoulder therebetween, a crimpable open-ended splicing sleeve press fitted in said bore and having one end thereof seated on said annular shoulder with the remainder projecting from said flange, and a cap detachably mounted on said flange and enclosing the projecting portion of said splicing sleeve, the diameter of said cap being greater than the diameter of said sleeve but less than the diameter of the flared portion of said skirt, said cap having an opening therein through which a spliced wire is adapted to pass, and a knockout disc closing said opening.

2. An electrical wire splicing device comprising a nylon insulating skirt flared at one end and terminating at its other end in a centrally bored flange, the bore having two diameters forming a continuous annular shoulder therebetween, the flange and the skirt forming therebetween an upwardly and outwardly tapered annular seat, a crimpable open-ended splicing sleeve press fitted in said bore and having one end thereof seated on said annular shoulder and the other end projecting from said flange, and a cap detachably mounted on said flange and enclosing the projecting portion of said splicing sleeve, the diameter of said cap being greater than the diameter of said sleeve but less than the diameter of the flared portion of said skirt, the inner end of said cap being tapered to conform to the tapered annular seat, whereby when the cap is mounted on said flange, said flange is tightened against said sleeve.

3. In a wire splicing device the combination of a non-metallic insulating skirt open at one end and terminating at its other end in a centrally bored flange, the bore having two diameters forming a continuous annular shoulder therebetween, and a crimpable cylindrical splicing sleeve open at each end for the passage of wire portions therethrough, press fitted in the bore of said insulating skirt and having one end flared outwardly and seated on said annular shoulder with the flared portion bearing solidly against said flange, and the remainder of said sleeve projecting from said flange, said flange having means associable with a cap.

4. The combination as claimed in claim 3 in which said insulating skirt comprises a non-metallic insulating skirt open at one end and terminating at its other end in a centrally bored flange, the outer end of said flange constituting a continuous annular shoulder, and in which said splicing sleeve comprises a crimpable cylindrical sleeve, open at each end for the passage of wire portions therethrough, press fitted in said bore, and having an outwardly projecting annular rib positioned intermediately of the ends of said sleeve and seated securely against said continuous shoulder, the portion of said sleeve outwardly of said rib extending beyond said flange and means on said flange associable with a cap.

5. An electrical wire splicing device comprising a skirt of non-metallic insulating material open at one end and terminating at its other end in a centrally bored boss, the bore having two diameters forming a continuous annular shoulder therebetween, a crimpable cylindrical splicing sleeve open at at least one end for the reception of wires, a first portion of said sleeve press fitted in said bore, a second portion of said sleeve seated on said annular shoulder and a third portion of said sleeve projecting from said boss, and a cap adapted to be detachably mounted on said boss to enclose said third portion of said sleeve.

6. An electrical wire splicing device comprising a skirt of non-metallic insulating material open at one end and terminating at its other end in a centrally bored boss, the outer end of said boss constituting a continuous annular shoulder, a crimpable cylindrical splicing sleeve open at at least one end for the reception of wires, a first portion of said sleeve press fitted in said bore, said sleeve having an outwardly projecting annular rib intermediate the ends of said sleeve and seated securely against said annular shoulder, and a second portion of said sleeve extending beyond said boss, and a cap adapted to be detachably mounted on said boss to enclose said second portion of said sleeve.

7. An electrical wire splicing device comprising a nylon skirt flared at one end and terminating at its other end in a centrally bored boss, the bore having two diameters forming a continuous annular shoulder therebetween, a crimpable cylindrical splicing sleeve open at at least one end for the reception of wires, a first portion of said sleeve press fitted in said bore, a second portion of said sleeve seated on said annular shoulder and a third portion of said sleeve projecting from said boss, and a cap adapted to be detachably mounted on said boss to enclose said third portion of said sleeve.

8. An electrical wire splicing device comprising a nylon skirt flared at one end and terminating at its other end in a centrally bored boss, the bore having two diameters forming a continuous annular shoulder therebetween, a crimpable cylindrical splicing sleeve open at at least one end for the reception of wires, a first portion of said sleeve press fitted in said bore, a second portion of said sleeve at one end thereof flared outwardly and seated on and bearing solidly against said continuous annular shoulder and a third portion of said sleeve projecting from said boss, and a cap adapted to be detachably mounted on said boss to enclose said third portion of said sleeve.

9. An electrical wire splicing device comprising a skirt of non-metallic insulating material open at one end and terminating at its other end in a centrally bored boss providing a continuous annular shoulder, a crimpable cylindrical splicing sleeve open at at least one end for the reception of wires, a first portion of said sleeve press fitted in said bore, a second portion of said sleeve seated on said annular shoulder and a third portion of said sleeve projecting from said boss, and a cap adapted to be detachably mounted on said boss to enclose said third portion of said sleeve.

10. A pigtail connector formed of two separate parts, one of said parts comprising a tubular body member of molded thermoplastic material provided at one end with an outwardly flared skirt portion, the opposite end of said body member being reduced in diameter and externally screw threaded, a cylindrical sleeve of ductile metal having an end portion of relatively larger diameter anchored in the reduced end of said body member with the opposite end portion of said sleeve projecting axially beyond the reduced end of said body member and adapted to be deformed into crimped engagement with electric conductors intruded through the skirt end of said body member into said sleeve, and a cap of insulating material provided with internal screw-threads at its open end for removably engaging the external screw-threads on the reduced end of said body member, said cap having an internal diameter inwardly of its internally screw-threaded open end to provide clearance space into which the projecting crimpable portion of said sleeve may be received in spaced relation thereto upon securing said cap on said body member.

UNITED STATES PATENTS

References Cited in the file of this patent

| | | |
|---|---|---|
| 1,626,875 | Reiser | May 3, 1927 |
| 1,635,293 | Sommer | July 12, 1927 |
| 2,526,277 | Rogoff | Oct. 17, 1950 |
| 2,589,368 | Graham | Mar. 18, 1952 |
| 2,715,654 | Lucas | Aug. 16, 1955 |

FOREIGN PATENTS

| | | |
|---|---|---|
| 632,029 | Great Britain | Nov. 15, 1949 |